United States Patent Office.

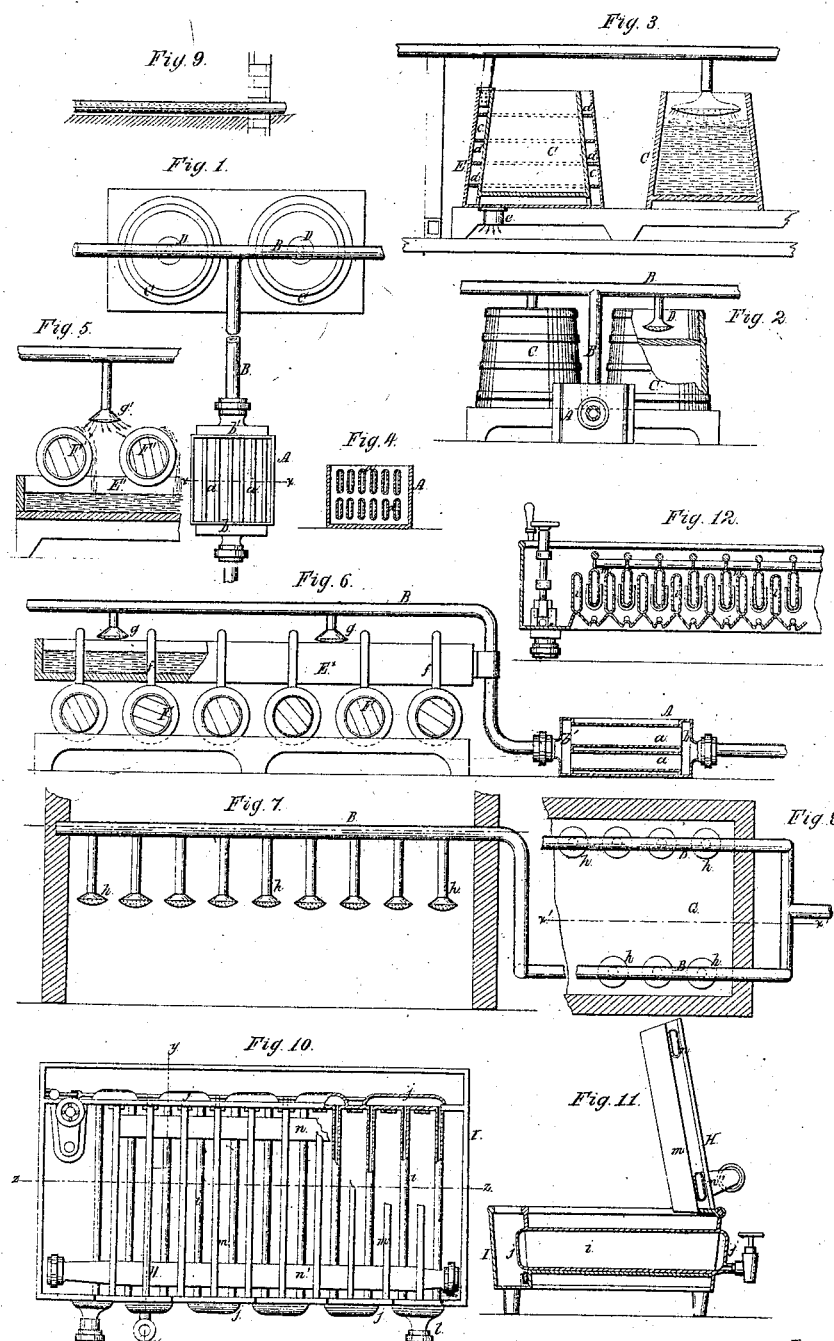

ANDREW BARCLAY WALKER, OF WARRINGTON, ENGLAND.

Letters Patent No. 76,853, dated April 14, 1868.

IMPROVEMENT IN APPARATUS FOR BREWING, MALTING, &c.

*The Schedule referred to in these Letters Patent and making part of the same.*

TO ALL WHOM IT MAY CONCERN:

Be it known that I, ANDREW BARCLAY WALKER, of Warrington, in Lancashire, and Kingdom of England, have invented new and useful Improvements in Apparatus for Brewing, Malting, Distilling, and Drying; and I do hereby declare that the following is a full, clear, and exact description thereof, which will enable those skilled in the art to make and use the same, reference being had to the accompanying drawings, forming part of this specification.

My improvement has for its special object the facilitating of the process of brewing and distilling by attemperating the atmosphere in the gyle-tun rooms, or the atmosphere immediately surrounding the gyle-tuns, or attemperating the worts by a direct application of the air to the same, to that degree of temperature in summer or winter by which the process of vinous fermentation may be most successfully conducted, never allowing the temperature to rise above or fall below that degree of temperature, during which the azotic constituents of the worts become most speedily oxidized by the oxygen of the atmosphere; and further, the maintenance of that degree of sentability or uniformity of temperature throughout the process of fermentation. In the accompanying sheet of drawings—

Figure 1 represents a plan or top view of my improved means for attemperating atmospheric air and conducting the same directly to the worts in the gyle-tuns.

Figure 2, an elevation of the same.

Figure 3, a sectional elevation of the means employed for attemperating the air immediately surrounding the gyle-tuns.

Figure 4, a section of fig. 1, taken in the line $x\ x$.

Figure 5 shows the means employed for preserving the yeast in the yeast-troughs or receivers.

Figure 6 shows a modification of the plan shown in fig. 5.

Figure 7 is a vertical longitudinal section of a modification of my invention for regulating the temperature of the atmosphere in the malting-rooms, taken in the line $x'\ x'$, fig. 8.

Figure 8, a plan or top view of fig. 7.

Figure 9 shows a modification of my invention for attemperating the air in gyle-tun rooms, store-rooms, or cellars.

Figure 10, a plan or top view, partly in section, of a modification of my attemperator, which is shown more particularly in figs. 1 and 4.

Figure 11, a transverse vertical section of fig. 10, shown in fig. 10, taken in the line $y\ y$.

Figure 12, a longitudinal vertical section of fig. 10, taken in the line $z\ z$.

Similar letters of reference indicate corresponding parts.

A represents a box or vessel, of rectangular or other proper form, constructed of tinned copper or other suitable material.

Within this box or vessel I fix a tube or series of tubes, $a$, passing from end to end, and communicating with chambers, $b\ b'$, at their ends, as shown more particularly in fig. 6.

Through this box or vessel, A, I cause a constant supply of spring-water to flow, by means of a pump or otherwise, or I fill the vessel with ice, or ice and common salt, or other salts or acids, or salts and acids combined.

Through the tube or tubes $a$ in the vessel, I force atmospheric air by means of a pump or pumps, cylinder or cylinders, fan or fans, or bellows.

The atmospheric air is thus cooled or attemperated by passing through the tube or tubes $a$, surrounded with the water or freezing-mixture or mixtures. The atmospheric air thus cooled or attemperated, I conduct from the vessel by means of a pipe or pipes, B, to the place required.

In figs. 1 and 2, this cold air is shown conducted by the pipes B directly over the gyle-tuns C C, a rose or douche, D, projecting from a pipe, B, directly over the yeast or worts in each gyle-tun, so that a shower of cool air will be discharged over the surface of the yeast or worts.

During the winter season the natural temperature of the air will be sufficiently low to render the use of the attemperator unnecessary, and the air may be impelled directly through the pipe or pipes B.

In fig. 3, a modification of the above plan is shown.

The gyle-tuns are constructed with a jacket or outer case, E, with a space between, provided with horizontal partitions at a suitable distance apart, to form chambers, $c$, which communicate one with another by openings, $d$, made consecutively at opposite sides of the gyle-tuns. The cold air is admitted into the upper chamber $c$, and traverses around the gyle-tun through the several chambers, and is discharged at $e$.

In fig. 6, a plan is shown for preserving the yeast in the receivers or troughs.

E× is the yeast-trough, into which the yeast passes from the puncheons F by the pipes $f$, B being the pipe from the attemperator or fan. $g$, roses or douches, for distributing the air over the surface of the yeast.

In fig. 5, a modification of this plan is shown, E′ being the yeast-trough, into which the yeast passes from the puncheons F′.

B, pipe from the attemperator or fan, and $g'$, roses or douches for distributing the air over the surface of the yeast.

In figs. 7 and 8 a plan is shown for regulating the temperature of the atmosphere in the malting-rooms.

G represents the malting-room. B, pipes for conducting air from attemperator or fan. $h$, roses or douches for discharging the air over the malt on the floor, or discharging into the room.

Instead of the roses or douches, the pipes B may be perforated with small holes, for discharging the air into the room.

By placing the attemperator over the furnace, the air may be heated and forced into and through a room for drying malt, hops, and other substances, (see fig. 9.)

A modification of the attemperator illustrated in figs. 1, 2, 4, and 6 is shown in figs. 10, 11, and 12.

In this modification, one-half, or any proper number of the tubes of the attemperator are placed in a hinged frame, A, which is attached to and forms a part of the attemperator, or the frame, instead of being hinged to the box of the attemperator, may be otherwise arranged, so that its tubes may be set within said box and lifted bodily out therefrom.

The box I of the attemperator in this case is provided with tubes, $i$, the ends of which communicate with chambers, $j$, to form a sinuous route or passage for the air or fluid, as shown clearly in fig. 10, $k$ being the induction and $l$ the eduction-tube. The tubes $m$ in the frame II, when the latter is adjusted on the box of the attemperator, fit between the tubes $i$ in the box. The tubes $m$ communicate near their ends with tubes $n$ $n'$ in such a manner as to admit of a sinuous route or passage for the air or fluid through the tubes $m$.

By this arrangement two separate and distinct passages are obtained, the worts being in the spaces between the tubes, cold air being forced through one set of tubes, and a freezing-mixture through the other set, the worts being in the space between the tubes, or worts may be forced through one set of tubes and cold air through the other, a freezing-mixture being passed through the box of the attemperator.

I claim as new, and desire to secure by Letters Patent—

1. The general construction and arrangement of the apparatus for attemperating air, as described, and illustrated in figs. 1, 2, 4, and 6 of the accompanying drawings.

2. The construction and arrangement of the apparatus for preserving yeast or worts in gyle-tuns, as described, and illustrated in figs. 2 and 3 of the accompanying drawings.

3. The means employed for preserving yeast in the troughs or receivers, as described, and illustrated in figs. 5 and 6 of the accompanying drawings.

4. The construction and arrangement of the apparatus for attemperating the atmosphere in malting-rooms, gyle-tun rooms, cellars, &c., &c., as described, and illustrated in fig. 7.

5. The construction and arrangement of the apparatus for cooling worts, as described, and illustrated in figs. 10, 11, and 12 of the accompanying drawings.

The above specification of my invention signed by me, this 25th day of February, 1868.

ANDREW BARCLAY WALKER.

Witnesses:
    JOHN PRICE,
    PETER WRIGHT.